US006597549B2

(12) United States Patent
Anand et al.

(10) Patent No.: US 6,597,549 B2
(45) Date of Patent: Jul. 22, 2003

(54) CAPACITOR SWITCH WITH EXTERNAL RESISTOR AND INSERTION WHIP

(75) Inventors: Raj Anand, McDonough, GA (US); Joseph R. Rostron, McDonough, GA (US); Cary J. Ahrano, Mcdonough, GA (US)

(73) Assignee: Southern States LLC, Hampton, GA (US)

( * ) Notice: Subject to any disclaimer, the term of this patent is extended or adjusted under 35 U.S.C. 154(b) by 0 days.

(21) Appl. No.: 10/293,723

(22) Filed: Nov. 13, 2002

(65) Prior Publication Data

US 2003/0062778 A1 Apr. 3, 2003

Related U.S. Application Data

(63) Continuation of application No. 09/883,587, filed on Jun. 18, 2001, now Pat. No. 6,483,679.

(51) Int. Cl.[7] .................................................. H01G 2/12
(52) U.S. Cl. .......................................................... 361/15
(58) Field of Search ................................ 361/7, 15, 14, 361/54, 140, 152, 154, 153, 143, 144, 148; 200/43.08, 48 R, 48 P

(56) References Cited

U.S. PATENT DOCUMENTS

| | | | |
|---|---|---|---|
| 3,148,260 | A | 9/1964 | Upton, Jr. |
| 3,376,475 | A | 4/1968 | Greger |
| 3,482,069 | A | 12/1969 | Badey et al. |
| 3,538,276 | A | 11/1970 | Leeds |
| 3,566,061 | A | 2/1971 | Bernatt |
| 3,576,414 | A | 4/1971 | Mikos |
| 3,588,406 | A | 6/1971 | Bernatt |
| 3,614,530 | A | 10/1971 | Baltensperger |
| 3,763,340 | A | 10/1973 | Noack |
| 3,836,819 | A | 9/1974 | Clausing |
| 3,863,041 | A | 1/1975 | Rostron et al. |
| 3,912,975 | A | 10/1975 | Knauer et al. |
| 3,927,350 | A | 12/1975 | McConnell |
| 4,069,406 | A | 1/1978 | Meinders |
| 4,072,836 | A | 2/1978 | Bischofberger et al. |
| 4,184,186 | A | 1/1980 | Barkan |
| 4,324,959 | A | 4/1982 | Hall et al. |
| 4,443,674 | A | 4/1984 | Calvino |
| 4,550,356 | A | 10/1985 | Takahashi |
| 4,567,538 | A | 1/1986 | Arimoto et al. |
| 4,695,918 | A | 9/1987 | O'Leary |

*Primary Examiner*—Edward H. Tso
(74) *Attorney, Agent, or Firm*—Michael J. Mehrman; Mehrman Law Office P.C.

(57) ABSTRACT

An interrupter switch mechanism 18, an actuator mechanism 20 for operating the switch mechanism 18, an engagement arm 30 such as a whip, a first resistor 22, a second resistor 26, a drive mechanism 64 for pivoting the engagement arm 30 into contact with the resistors 22 and 26, and a drive shaft 62. The drive mechanism 64 has a first hub 82, a second hub 84 that is biased relative to the first hub 82, and a pivotal latch member 66 that is biased towards an engaged position with the second hub 94. The drive shaft 62 sequentially operates the drive mechanism 64 to introduce the first resistor 22 and then the second resistor 26, and then operates the actuator 20 to close the switch mechanism 18, for reducing electrical disturbances when switching a capacitor bank 12 into an electric power circuit 16.

36 Claims, 17 Drawing Sheets

CAPACITOR SWITCH WITH EXTERNAL RESISTOR AND INSERTION WHIP

This continuation application claims the priority benefit of U.S. patent application Ser. No. 09/883,587, filed Jun. 18, 2001 now U.S. Pat. No. 6,483,679, which is hereby incorporated by reference in its entirety.

TECHNICAL FIELD

The present invention relates to switches for connecting and disconnecting high voltage devices to electric power circuits and, more particularly, to a switch with external resistors and a high speed whip and drive mechanism for staged insertion of the resistors when connecting a capacitor bank to a circuit.

BACKGROUND OF THE INVENTION

Electric power delivery systems such as those operated by electric utilities, large industrial facilities, military bases, and airports typically include a number of high voltage devices such as capacitor banks, voltage regulators, transformers, reclosers, surge arrestors, circuit breakers, and so forth. These devices are used in the operation of the system to maintain the quality of the electric power delivered at a power factor close to 1.0, to deliver the electric power at a certain voltage, to increase system reliability, and/or for other functions. Typically, each of these devices is connectable to the power circuit by a switch.

Conventional electric power switches have a male and a female contact that can be moved between a "closed" position with the contacts in physical contact and an "open" position with the contacts physically separated. For an electric power line that carries a high voltage and/or high current, it is desirable to open and close the male and female contacts very quickly in order to avoid a pre-strike, in which the electric current arcs across a physical gap between the contacts. Pre-strikes impose high current spikes and serious voltage disturbances on the power line, and can also physically degrade the components of the switch, especially the contacts. These current spikes and voltage disturbances can also damage other pieces of equipment connected to the circuit.

Pre-strikes occur when the switch's contacts are not yet in physical contact in the closing operation, but are still close enough to each other to permit electric current to arc through the air or other media between the contacts. When the contacts of a properly designed switch are fully separated in the open position, the distance between the contacts is sufficient to minimize pre-strikes. However, a pre-strike can occur as the contacts are moved through a "closing stroke" from the fully separate, open position to the fully connected, closed position. Likewise, an arc can occur across a gap between the contacts as the contacts are moved through an "opening stroke" from the closed position to the open position.

In order to minimize the occurrence of pre-strikes and their associated problems, "interrupter" switches are often provided with high-speed mechanisms for closing the contacts either at voltage zero or after the voltage is minimized by a pre-insertion impedance which minimizes the closing transients. Such mechanisms are sometimes provided by spring-loaded mechanisms. Also, the contacts of interrupter switches are sometimes provided in a sealed housing with a dielectric gas, vacuum, or other media for quenching the arc. Additionally, interrupter switches are sometimes provided with a linkage connected to an actuator having an electric motor, fluid cylinder, or the like. Such linkages and actuators are designed for generating a large force to increase the velocity of the opening and closing strokes, operating the contacts of a three-phase switch simultaneously, and/or operating the switch remotely.

Typically, interrupter switches are designed to prevent restrikes when "opening" the switch under a load. However, when "closed" switching a charged capacitor bank into the power circuit, conventional interrupter switches often are not able to prevent pre-strikes.

Charged capacitor banks are switched into the power circuit to correct the power factor during high-load periods, and later switched out of the circuit when the load drops. Capacitor banks store a charge, for example, 1 "per unit" (PU), and electric power systems operate at a system voltage, plus or minus 1 PU. Therefore, a conventional system-rated capacitor switch for connecting a 1 PU capacitor to the power circuit will be subjected to a 0 to 2 PU voltage surge when closing to connect the charged capacitor bank to the circuit, often resulting in intense high overvoltages. Additionally, capacitor banks are often connected and disconnected to the power circuit several times a day as the system load varies, resulting in multiple overvoltages each day.

Specialized capacitor switches have been developed in an effort to address this problem. One such type of capacitor switch has a series of sacrificial contacts that are designed to deteriorate over time as a result of current surges. However, these contacts must be regularly monitored and replaced as they deteriorate, thereby increasing the cost of using this type of switch. Because capacitor banks are often connected and disconnected to the power circuit more than once a day, the contacts must be monitored and replaced on a very strict basis. These switches do not prevent pre-strikes when connecting a charged capacitor bank to the power line, so the electric power system is still subjected to damaging current spikes and voltage disturbances. This is in part because these switches are generally based on conventional interrupter switch designs which prevent restrikes upon opening the switch, but for capacitor switching the potential for pre-strikes is greatest upon closing of the switch.

Another type of known capacitor switch includes a resistor in series with the capacitor when the capacitor is first connected into the circuit in order to reduce the current spikes. However, these devices tend to be unwieldy, bulky, and very difficult to time so that they are introduced into the circuit just as the capacitor is connected to reduce these inrush currents.

Accordingly, there is a need in the art for a capacitor switch for connecting a charged capacitor bank to an electric power circuit with controlled current spikes, that is easy to adjust for properly timing the switching operation, that is durable and reliable over thousands of operations, and that can be made and used at an affordable cost.

SUMMARY OF THE INVENTION

The present invention satisfies the aforementioned needs by providing a switch for gradually stepping a capacitor bank into an electric power circuit to compensate for power factor deviations. This is accomplished by providing two (or another number of resistors or other current limiting devices) and a conventional interrupter switch mechanism configured in series with the capacitor bank. Current flow is initiated in a staged sequence through the first resistor, then the second resistor, then the switch mechanism. The first resistor has a significantly higher resistance than the second resistor, which in turn has a significantly higher resistance than the switch mechanism. In this fashion, current flow from the charged capacitor bank is gradually stepped into the circuit, thereby significantly reducing electrical disturbances in the capacitor bank, the switch, and the circuit.

Additionally, the staged sequence of introducing the resistors and the switch mechanism is accomplished by the provision of a drive mechanism for operating an engagement arm to introduce the first and second resistors into the circuit, and an actuator for operating the switch mechanism. The drive mechanism and the actuator are operatively coupled together by a drive shaft or another linkage, with the drive mechanism, the actuator, and/or the drive shaft being readily adjustable to accomplish the desired timing of the sequence. The drive mechanism and the actuator are operable by the drive shaft to sequentially introduce the resistors into the circuit, then to introduce the switch mechanism and remove the resistors from the circuit so that the circuit has the full benefit of the capacitor bank for achieving power factor correction. Furthermore, the drive mechanism, the actuator, the switch mechanism, and the drive shaft can be provided by or made of relatively simple, readily available components, so that the switch is reliable, durable, and cost effective to implement in large quantities. For example, the switch mechanism can be provided by a conventional interrupter switch mechanism having a housing containing the contacts and a dielectric gas such as SF6, with the resistors disposed external of the housing.

Generally described, the switch includes a switch mechanism having a first contact and a second contact, an actuator mechanism coupled to the switch mechanism and operable to move the switch contacts between an open position and an closed position, a first resistor, a second resistor, an engagement arm such as a whip, a drive mechanism coupled to the engagement arm and operable to pivot the engagement arm between an open position and a closed position, and a drive shaft coupled to and operating the actuator mechanism and the drive mechanism. When the drive shaft rotates in a closing stroke, it operates the drive mechanism to pivot the engagement arm into contact with the first resistor then into contact with the second resistor, and operates to cause the actuator to close the switch mechanism contact just after the engagement arm contacts the second resistor.

In one aspect of the invention, the first and second resistors each have a contact adapted to receive the engagement arm, with each of the contacts positioned so that, when the engagement arm moves from the open to the closed position, the contact end of the first resistor receives the engagement arm before the contact end of the second resistor receives the engagement arm. Thus, the first resistor contact can have a length that is greater than a length of the second resistor contact.

In another aspect of the invention, the drive mechanism has a first hub that is coupled to the drive shaft and that moves between a first hub open position and a first hub closed position in response to rotation of the drive shaft, with the first hub having a latch release member. Also, the drive mechanism can have a second hub that is spring-biased to move between a second hub open position and a second hub closed position in response to rotation of the first hub, with the second hub having a catch member and where the engagement arm is coupled to the second hub. Additionally, the drive mechanism can have a movable latch member that is biased towards an engaged position where the latch member contacts the catch member and prevents movement of the second hub from the second hub open position to the closed position. The latch release member can be positioned so that, when the first hub is moved from the first hub open position toward the closed position, the latch release member contacts and moves the latch member away from the second hub into a disengaged position, thereby permitting the second hub and the engagement arm to move from the open position to the closed position at a high velocity under the force of the spring.

In yet another aspect of the invention, the latch member has an adjustable closing latch member that is positioned so that, when the first hub is moved from the first hub open position toward the closed position, the latch release member contacts the adjustable closing latch member. Also, the second hub can have an adjustable stop member positioned thereon so that, when the first hub moves from the first hub closed position toward the open position, the latch release member contacts the stop member and causes the second hub to move from the second hub closed position to open position. Additionally the latch member can have an opening latch surface defined thereon so that, when the second hub moves from the second hub closed position to the open position in response to movement of the first hub from the first hub closed position to the open position, the catch member contacts the opening latch surface and moves the latch member from the latch engaged position to the disengaged position.

In a further aspect of the invention, there are provided three of the switches forming a three-pole switch for use in a three-phase electric power circuit. Additionally, a three-pole operator mechanism with an operator can be connected to the three-pole switch, for remote operation of the three-pole switch.

Another aspect of the invention is that the switch can be configured with the resistors and the interrupter switch mechanism in series, with the drive mechanism configured for generating a whip action during the opening stroke. In this manner, the switch can be used to split the voltage during and achieve a smoother opening of the switch.

In yet another aspect of the invention, a separate whip or other engagement arm can be provided for each resistor and contact. In this manner, there is provided greater flexibility and reliability of the switch.

In still a further aspect of the invention, there is provided a method for switching an electrical device into an electric power circuit. The method can include the steps of providing a switch mechanism, a first resistor, and a second resistor, initiating a current flow through the first resistor, initiating a current flow through the second resistor and limiting the current flow through the first resistor, and initiating a current flow through the switch mechanism and limiting the current flow through the first and second resistors. Also, the steps of initiating a current flow through the first and second resistors can include providing an engagement arm pivotally coupled to the switch mechanism and pivoting the engagement arm from an open position separated from the first and second resistors to a closed position in contact with the first and second resistors so that the engagement arm contacts the first resistor before the engagement arm contacts the second resistor.

Additionally, the step of pivoting the engagement arm from the open position to the closed position can include providing at least one drive mechanism coupled to the engagement arm, providing a rotary drive shaft operatively coupled to the drive mechanism, rotating the drive shaft, preventing pivoting of the engagement arm and generating a spring-loaded force urging the engagement arm to pivot from the open position to the closed position, releasing the engagement arm, and pivoting the engagement arm in response to the spring force. Furthermore, the step of initiating a current flow through the switch mechanism can include providing an actuator mechanism operatively coupled to the switch mechanism and coupled to the rotary drive shaft, and actuating the actuator, in response to rotation of the drive shaft, to close the contacts of the switch mechanism to initiate current flow through the switch mechanism and limit the current flow through the first and second resistors.

In view of the foregoing, it will be appreciated that the present switch provides a substantial improvement over the prior art by significantly reducing the electrical disturbances caused when connecting a capacitor bank to an electric power circuit. The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE EXEMPLARY EMBODIMENTS

Figure 1:
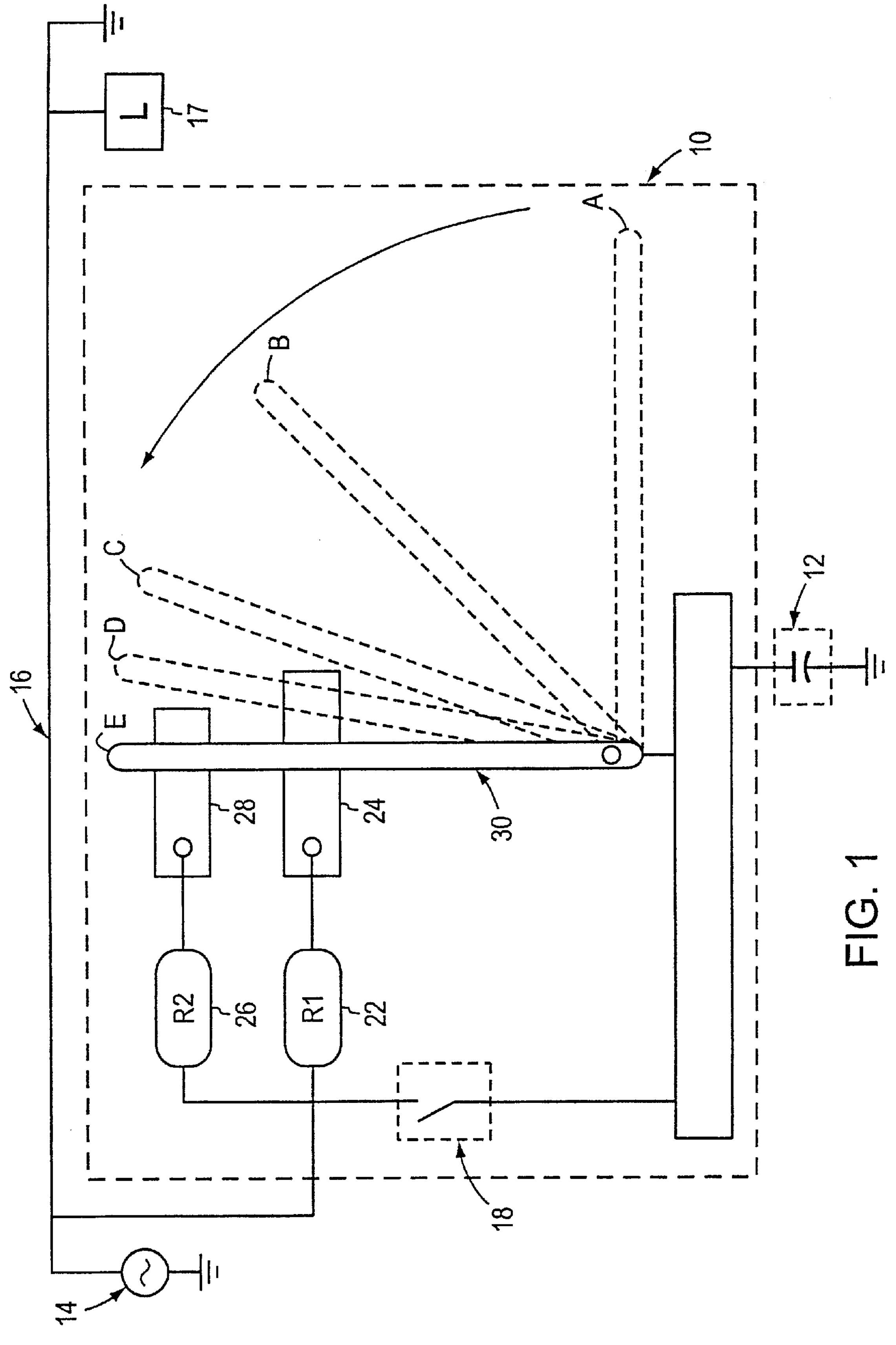
FIG. 1 is a schematic diagram of an exemplary embodiment of the present invention, showing a staged introduction a first resistor, a second resistor, an interrupter switch mechanism, and a capacitor bank into an electric power circuit.

Referring now to FIG. 1, there is shown an exemplary embodiment of the present invention, referred to generally as the switch 10. The switch 10 is electrically connected to an electrical device such as a capacitor or a bank of capacitors 12, or another high voltage device, by electrically connections known in the art. Also, the switch 10 is electrically connected to a power line 16 that delivers electric power from a power source 14 to one or a number of loads 17. The capacitor bank 12, power line 16, and power source 14 are typically grounded by conventional ground wires.

The switch 10 includes a conventional interrupter switch mechanism 18, at least one current initiation device such as a relatively high resistance first resistor 22 with a first contact 24 and a relatively low resistance second resistor 26 with a second contact 28, and a movable engagement arm 30. The resistors 22 and 26 and contacts 24 and 28 are configured in parallel with the switch mechanism 18. Accordingly, when the switch 10 is operated through a closing stroke, the engagement arm 30 moves from an open position A, through an intermediate position B, a first resistor contact position C, and a second resistor contact position D, and to a closed position E.

In the open position A, the engagement arm 30 is spaced sufficiently apart from the resistors 22 and 26 and the resistor contacts 24 and 28 to form a gap across which current strikes and pre-strikes normally can not occur. In the intermediate position B, the gap is approaching the point where current strikes might occur, but the current is significantly limited by the first resistor 22 such that over-voltages normally will not occur.

In the first resistor contact position C, the engagement arm 30 comes into electrical contact with the first resistor 22 via the first contact 24, thereby forming a first current path and initiating a limited current flow through the first resistor 22 to significantly dampen the initial electrical disturbances of closing the switch. In the second resistor contact position D, the engagement arm 30 comes into electrical contact with the second resistor 26 via the second contact 28, thereby forming a second current path. The second resistor 26 has a substantially lower electrical resistance relative to the first resistor 22 such that, at position D, the first resistor 22 is effectively shorted out from the circuit. Thus, an increased current then flows through the second resistor 26, thereby providing a staged introduction of the capacitor bank 12 into the power line 16.

As the engagement arm 30 approaches the closed position :E, or just after or simultaneously therewith, the switch mechanism 18 is closed. This effectively shorts out the first and second resistors 22 and 26, so that substantially all of the current then flows through the switch mechanism 18. This staged arrangement of the first resistor 22, the second resistor 26, and the switch mechanism 18 provides a smooth introduction of the capacitor bank into the circuit with reduced electrical disturbances.

Figure 1A:
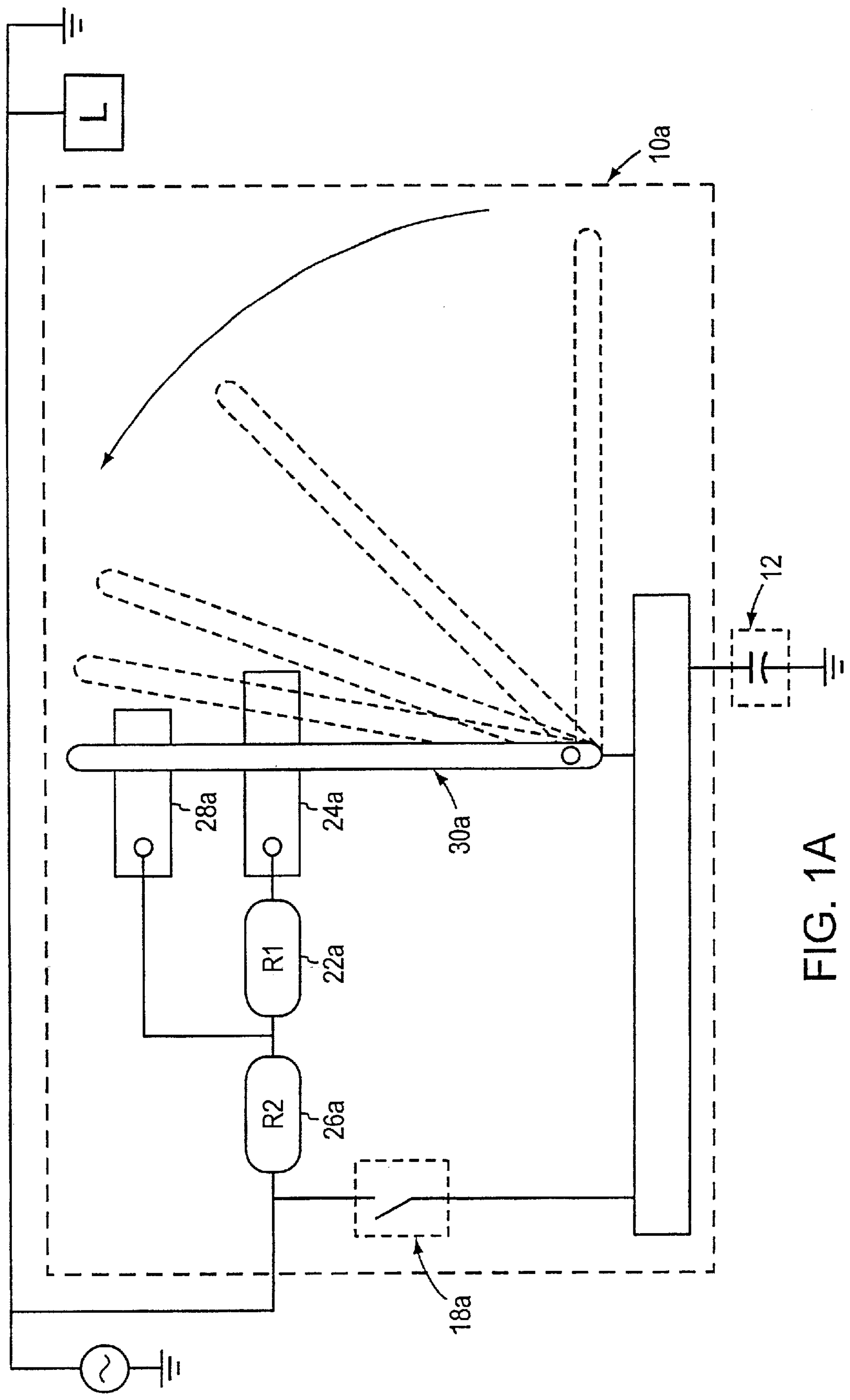
FIG. 1A is a schematic diagram of an alternative embodiment of the present invention, showing an alternative configuration of the first and second resistors.

Referring to FIG. 1A, there is shown an alternative switch 10*a*, with a first resistor 22*a* and contact 24*a*, a second resistor 26*a* and contact 28*a*, a switch mechanism 18*a*, and an engagement arm 30*a* that are similar to the like-named components of the above-described exemplary switch 10. In this arrangement, the resistors 22*a* and 26*a* are configured differently as shown in the drawing figures, but provide the same smooth introduction of the capacitor bank into the power circuit upon closing of the switch 10*a*.

Figure 2:
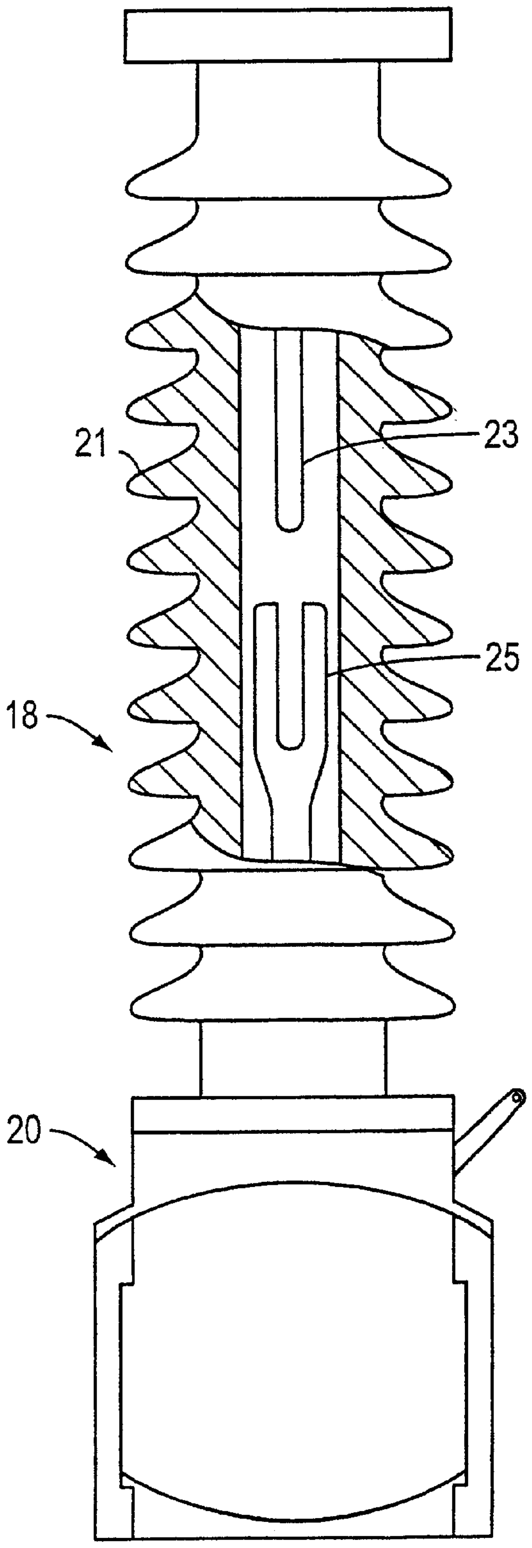
FIG. 2 is a side view of the interrupter switch mechanism of FIG. 1, showing the contacts and an actuator for operating the switch mechanism.

Referring now to FIG. 2, the switch mechanism 18 can be provided by a conventional interrupter switch mechanism having a housing 21, a first contact 23, and a second contact 25, as are known in the art. A dielectric gas such as SF6 or another medium such as a vacuum can be provided within the housing for quenching potential arcs. Alternatively, the switch mechanism can be provided by a conventional air-break switch, a non-interrupter switch, or another switch mechanism having linear, pivotal, rotary, or other arrangements of contacts, as are known in the art. Additionally, an actuator mechanism 20 can be operatively connected to the switch mechanism 18 for closing the contacts 23 and 25 in a timely fashion relative to closing of the engagement arm with the resistors. A suitable switch mechanism 18 and actuator mechanism 20 are disclosed by U.S. patent application Ser. No. 09/448,198 filed Nov. 23, 1999, which is hereby incorporated by reference in its entirety.

Figure 5:
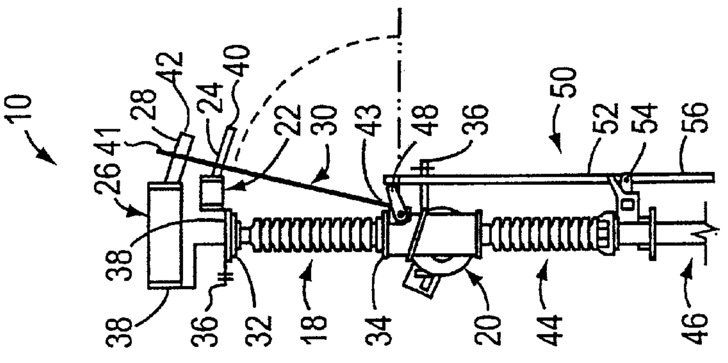
FIG. 5 is a side elevation view of the three-pole switch of FIG. 3.
Figure 4:
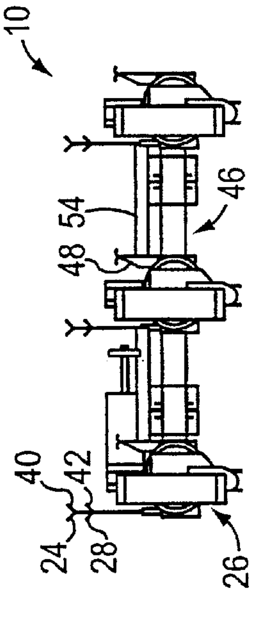
FIG. 4 is a plan view of the three-pole switch of FIG. 3.
Figure 3:
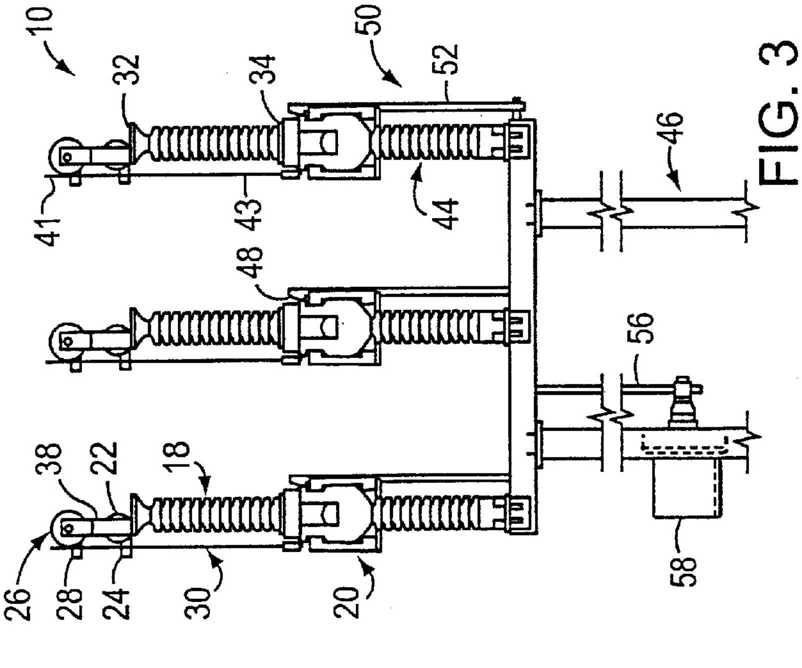
FIG. 3 is a front elevation view of a three-pole configuration of the switch of FIG. 1, also showing an operating mechanism for remotely operating all three poles of the switch simultaneously.

Referring now to FIGS. 3–5, which show a three-pole arrangement of three of the switches 10, each switch mechanism 18 has a first end 32 and a second end 34. Terminal pads 36 are provided at each of the ends 32 and 34 for connection thereto of conventional electric conductors. The contacts 23 and 25 of each switch mechanism 18 are electrically connected to the ends 32 and 34, forming a current path through the contacts 23 and 25, the switch mechanism ends 32 and 34, and the terminal pads 36, when the switch mechanism is closed.

The engagement arm 30 is coupled to the switch mechanism second end 34 by a drive mechanism (described below) that causes movement between the open and closed positions. Thus, the engagement arm 30 can be coupled to the switch mechanism 18 for permitting a motion that is pivotal, or another motion such as rotary or linear. The engagement arm 30 can be provided by a conventional whip made of a conductive material such as a metal. Alternatively, the engagement arm 30 can be provided by a blade, bar, pipe, or other structure known in the art.

The first resistor 22 and the second resistor 26 are connected to the first end 32 of the switch mechanism 18 by resistor support brackets 38. The resistor support brackets 38 can be made of an electrically conductive material such as a metal for forming a current path from the resistors to the terminal pads. Alternatively, the current path can be formed by a separate wire, bar, pipe, or other conductor.

The resistor contacts are arranged with the first contact 24 electrically connected to and extending from the first resistor 22 and the second contact 28 electrically connected to and extending from the second resistor 26. The first contact 24 has an engagement end 40 and the second contact 28 has an engagement end 42 that are positioned so that, when the engagement arm 30 pivots from the open to the closed position, first contact engagement end 40 receives the engagement arm 30 before the second contact engagement end 42 receives the engagement arm. For example, the first resistor contact 24 can have a length that is greater than a length of the second resistor contact 28. The contacts 24 and 28 are made of an electrically conductive material such as a metal, and can be provided by a generally rigid wire, or another structure such as a bar or pipe.

Because of the position of the resistor contacts 24 and 28, a first current path is formed through the engagement arm 30 and the first resistor 22 when the engagement arm contacts the first resistor contact 24, a second current path is formed through the engagement arm 30 and the second resistor 26 when the engagement arm 30 contacts the second resistor contact 28, and a third current path is formed through the contacts 23 and 25 of the switch mechanism 18 when the contacts are closed. The position of the engagement arm 30, the first resistor 22, the second resistor 26, and the switch mechanism 18 can be selected so that the first, second, and third current paths are in an electrically parallel configuration.

As described above, when the engagement arm 30 pivots from the open position to the closed position, the engagement arm 30 contacts the first contact engagement end 42 before the second contact engagement end 44, and the engagement arm 30 contacts the second contact engagement end 44 before the actuator 20 closes the switch contacts. Therefore, in order to provide the staged introduction of the capacitor bank into the electric circuit, the first resistor 22 has an electrical resistance that is substantially greater than an electrical resistance of the second resistor 26. For example, the first resistor 22 can be provided with an electrical resistance of 1,000 ohms, and the second resistor 26 can be provided with an electrical resistance of 10 ohms. Of course, other resistance ratings can be used, and/or the switch 10 can be provided with only one resistor or with three or more resistors. Also, other current initiation devices can be used, such as other current limiting devices or inductors, alone or in combination with one or more resistors, as may be desired in a given application.

In the three-pole arrangement shown, the switches 10 are each mounted on a support insulator 44, with the support insulators mounted onto a frame 46. Alternatively, the switch 10 can be provided in one-pole, two-pole, or other arrangement, as may be desired for a particular circuit. A pivotal drive arm 48 can be operatively coupled to each actuator 20 and to each engagement arm 30 (as described below), and driven by an operator mechanism 50. The operator mechanism 50 can have a drive rod 52 connected to each drive arm 48, an interphase rod 54 interconnecting the drive rods 52 for simultaneous operation of the three switches 10, a control rod 56 connected to the interphase rod 54, and a control actuator 58 connected to the control rod 56. The operator mechanism 50 thus provides for remote operation of the switch 10, as may be desired for substation control of a switch that is positioned out on a power line. It will be understood that the support insulator 44, the frame 46, the operator mechanism 50, and the control actuator 58 can be suitably provided by conventional structures and devices well known in the art. For example, the control actuator 58 can be provided with spur gears and a reversible ¼ HP, 125 volt DC motor.

Figure 6:
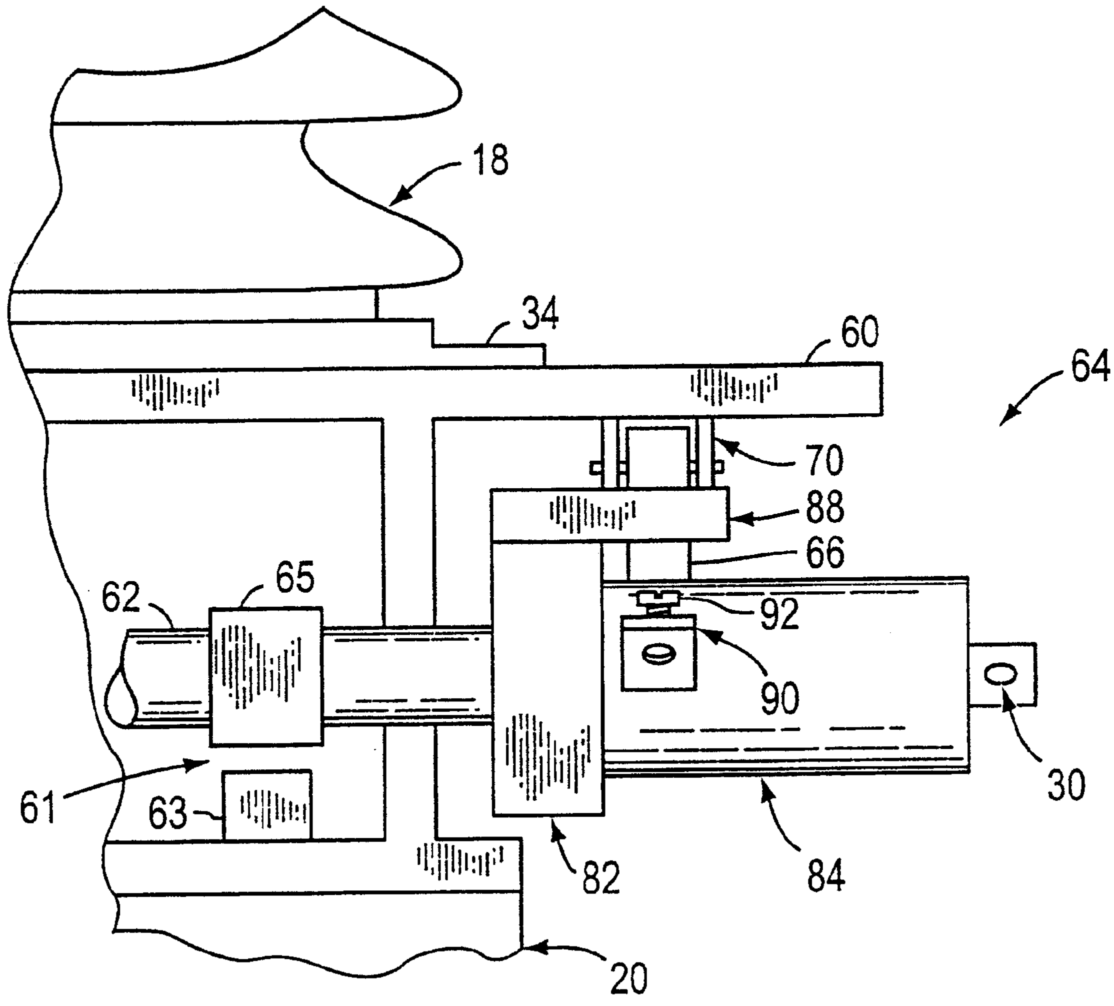
FIG. 6 is a detail rear elevation view of one pole of the switch of FIG. 3, showing a drive mechanism for operating the engagement arm.
Figure 7:
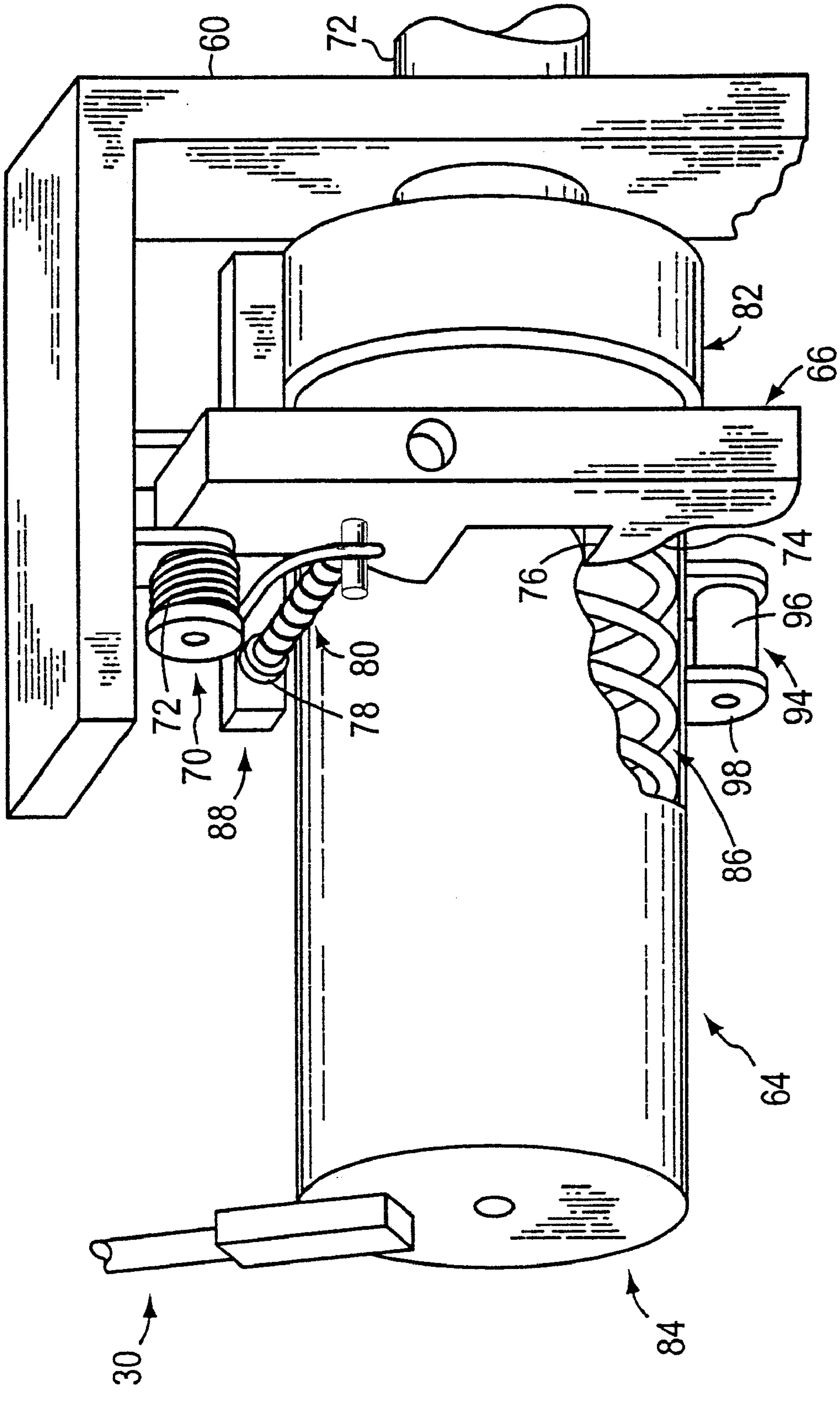
FIG. 7 is a front perspective view of the drive mechanism of FIG. 6.

Referring now to FIGS. 6 and 7, the switch mechanism actuator 20 and an engagement arm drive mechanism 64 are sequentially operated in response to movement of a drive member 62 such as a rotary drive shaft. The actuator 20 includes a trigger mechanism 61 that initiates operation of the actuator 20, thereby causing the switch mechanism 18 to operate between the open and closed positions. The trigger mechanism can be provided by a contact plunger 63 that is engaged by a cam 65 on the drive shaft 62, as described in U.S. patent application Ser. No. 09/448,198 filed Nov. 23, 1999. Of course, other trigger mechanisms can be suitably employed. The drive mechanism 64 is operable by the drive shaft 62 to move the engagement arm 30 between the open position and the closed position so that the engagement arm 30 contacts the first and second resistors 22 and 26 before the actuator 20 closes the contacts 23 and 25. The drive shaft 62 can be rotationally mounted to a support member 60 that is disposed between the switch mechanism 18 and the actuator 20. Alternatively, the drive shaft 62 can be mounted directly to the switch mechanism 18 or to an adjacent structure.

The drive mechanism 64 has a latch member 66 that is coupled to the support member 60 to permit the latch 66 to move between an engaged position and a disengaged position. For example, the latch member 66 can be pivotally coupled to the support member 60 by a conventional pivotal mounting 70. Alternatively, the latch member 66 can be coupled to the support member 60 to permit the latch 66 to move linearly, rotationally, or otherwise between the engaged and disengaged positions. The latch 66 is biased toward the engaged position by a spring 72 such as a coil, leaf, or other spring mechanism.

The latch member 66 has an opening surface 74, a catch surface 76, and a closing surface 78 formed thereon. The opening surface 74 and the catch surface 76 can be defined on opposite sides of a wedge-shaped protruding portion of the latch member 66. Alternatively, the protruding portion can have another regular or irregular shape, or be formed by a hook, wing, bar, arm, rod, or other structure. Also, the opening and catch surfaces 74 and 76 can be formed on adjustable members for adjusting the position of the surfaces 74 and 76. The closing surface 78 can be provided on a closing adjusting member 80 such as a threaded bolt received in a threaded aperture in the latch member 66. Alternatively, the closing adjusting member 80 can be provided by a threaded screw, a notched pin, a spring-loaded member, or another adjustable member, or the closing surface can be defined directly on a portion of the latch member 66.

The drive mechanism 64 also has a first hub 82 and a second hub 84 that are coupled to the drive shaft 62. The first hub 82 can be fixedly coupled to the drive shaft 62 to permit the hub 82 to rotate between a first hub open position and a first hub closed position in response to rotation of the drive shaft 62. The second hub 84 can be rotationally coupled to the drive shaft 62 and biased relative to the first hub 82 to permit the hub 84 to rotate between a second hub open position and a second hub closed position in response to rotation of the first hub 82. Thus, the second hub 84 can biased against rotation by a spring 86 such as a coil, leaf, or other spring structure connected between the second hub 84 and the first hub 82 or the drive shaft 62.

The engagement arm 30 is coupled to the second hub 84 so that the engagement arm 30 is pivoted from the open position to the closed position when the drive shaft 62 is rotated. Because a current path is formed through the engagement arm 30 and through the drive mechanism 64, selected components of the drive mechanism 64 (such as the first and second hubs 82 and 84) and the drive shaft 62 are made of electrically conductive material such as a metal. Alternatively, the current path can be provided through a separate wire or other conductor connected between the engagement arm 30 and the terminal pad 36 at the second end 34 of the switch mechanism 18.

The first hub 82 has a latch release member 88 and the second hub 84 has a catch member 94 that cooperate with the latch member 66 to pivot the engagement arm 30 closed, as described below. The release member 88 can be provided by a bar that extends over a portion of the first hub 82. Alternatively, the release member 88 can be provided by a rod or by an adjusting bolt or other adjusting member. The catch member 94 can be provided by a roller 96 rotationally mounted to a roller bracket 98. Alternatively, the catch member 94 can be provided by a wedge-shaped member, a rod, a bar, or by an adjusting bolt or other adjusting member.

The second hub 84 also has a stop member 90 that cooperates with the latch member 66 and the catch member 94 to pivot the engagement arm 30 open, as described below. The stop member can be provided by a stop adjusting member 92 such as a threaded bolt received by a threaded aperture in a bar, or by another adjusting mechanism. Alternatively, the stop member 90 can be formed integrally on the second hub 84.

Figure 8A:
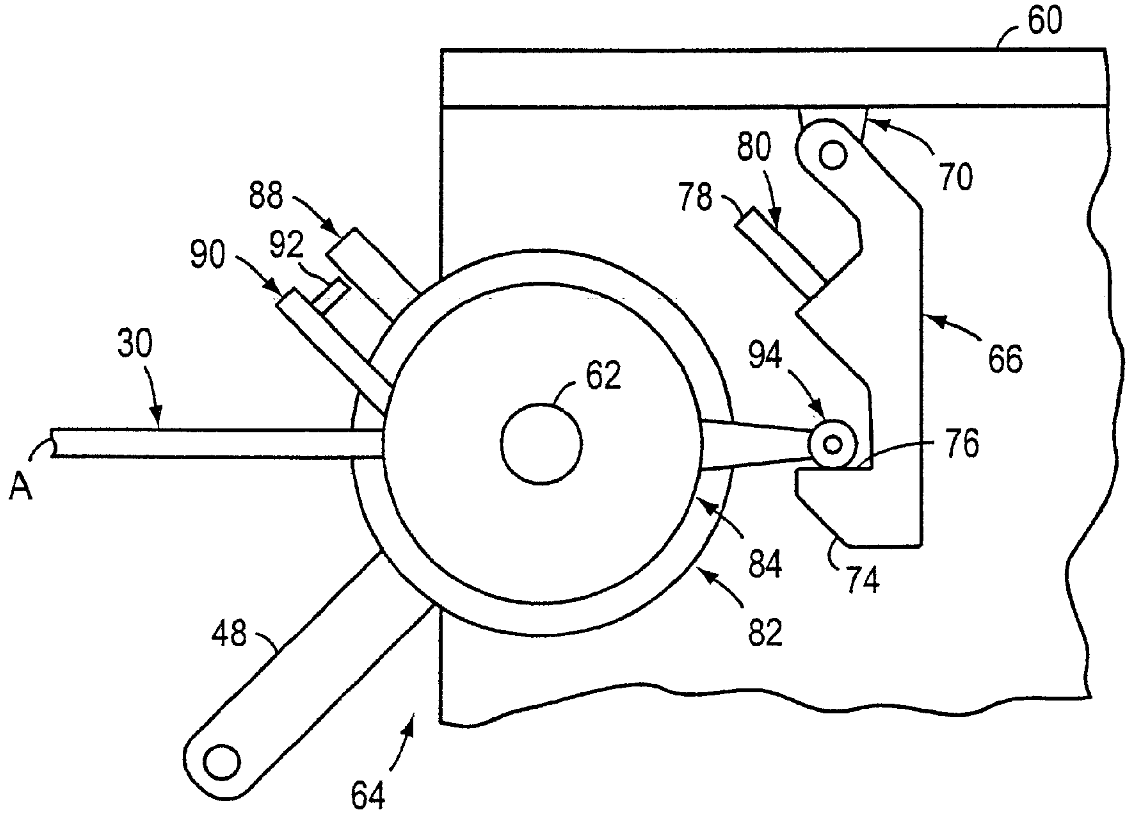
FIG. 8A is a side elevation view of the drive mechanism of FIGS. 6 and 7, showing the engagement arm in an open position.

Referring now to FIGS. 8A–8E, there is illustrated the operation of the drive mechanism 18 to pivot the engagement arm from the open to the closed position. FIG. 8A shows the engagement arm 30 in the open position A (see also FIG. 1), while the switch mechanism 18 is also in the open position. The latch member 66 is biased into the engaged position where the latch member catch surface 76 contacts the catch member 94 and prevents rotation of the second hub 94 from the second hub open position to the closed position.

Figure 8B:
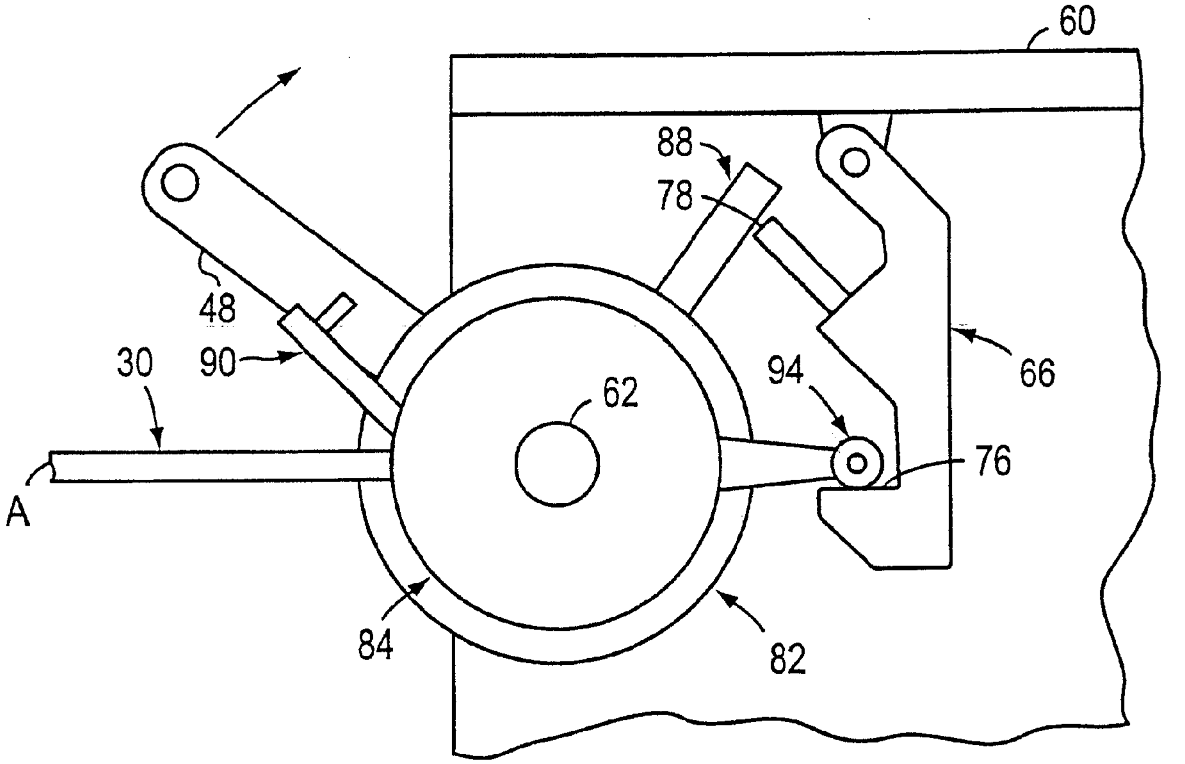
FIG. 8B is a side elevation view of the drive mechanism of FIG. 8A, showing the operation of the drive mechanism as the engagement arm is released to pivot through a closing stroke.
Figure 8C:
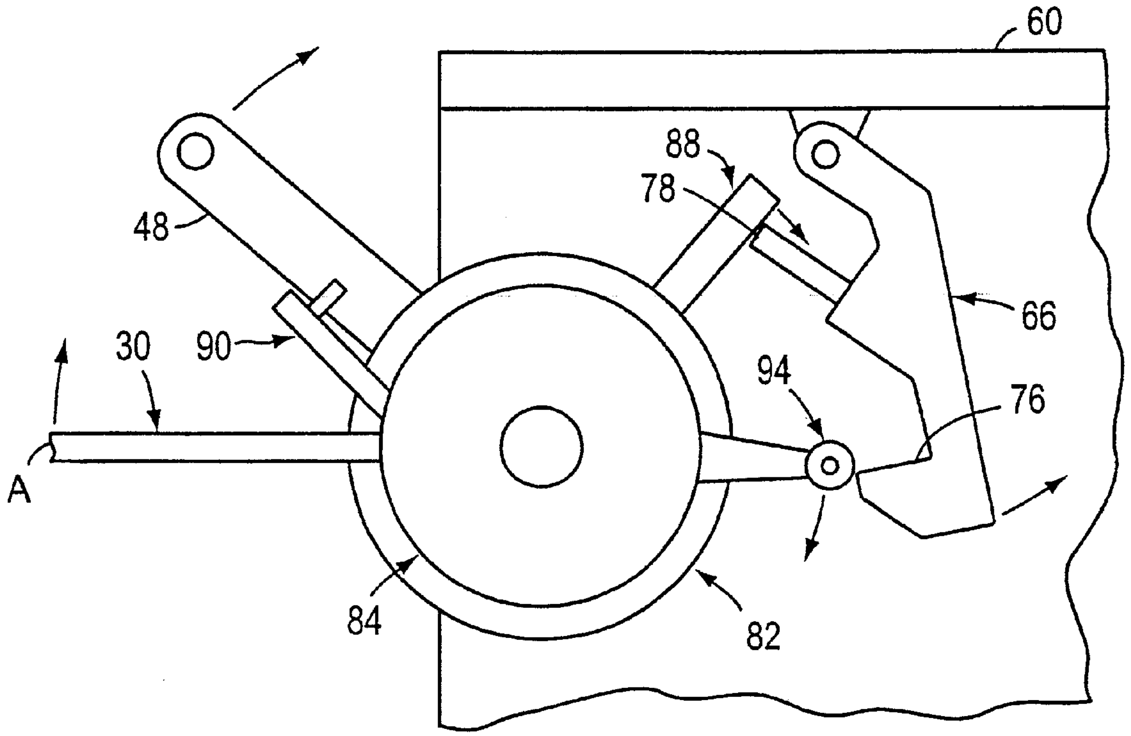
FIG. 8C is a side elevation view of the drive mechanism of FIG. 8A, showing the operation of the drive mechanism as the engagement arm begins to pivot through the closing stroke.

As shown in FIG. 8B, as the drive arm 48 is rotated, the first hub 82 rotates from the first hub open position toward the closed position, but the second hub 84 and the engagement arm 30 are held in position by the latch member 66, thereby loading the spring 86. As shown in FIG. 8C, as the drive arm 48 and the first hub 82 are further rotated, the latch release member 88 contacts the latch member closing surface 78 and pivots the latch member 66 away from the second hub into the disengaged position. The second hub 84 is now free to rotate.

Figure 8D:
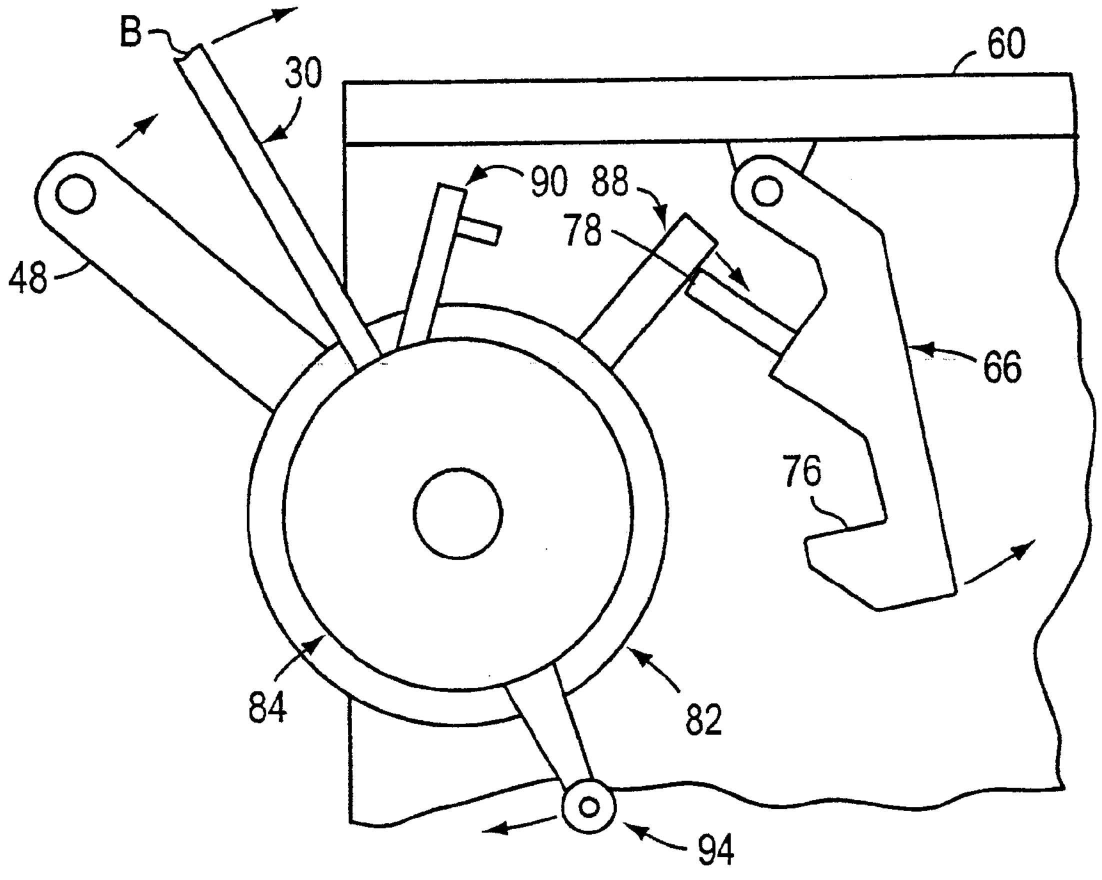
FIG. 8D is a side elevation view of the drive mechanism of FIG. 8A, showing the operation of the drive mechanism as the engagement arm pivots through the closing stroke.

As shown in FIG. 8D, under the force of the loaded spring 86, the second hub 84 and engagement arm 30 rotate at great velocity from the open position to the closed position. The engagement arm 30 thus pivots through the intermediate position B, the first resistor contact position C, and the second resistor contact position D (see FIG. 1), thereby providing the staged introduction of the first and second resistors 22 and 26 to significantly dampen the initial electrical disturbances of closing the switch.

Figure 8E:
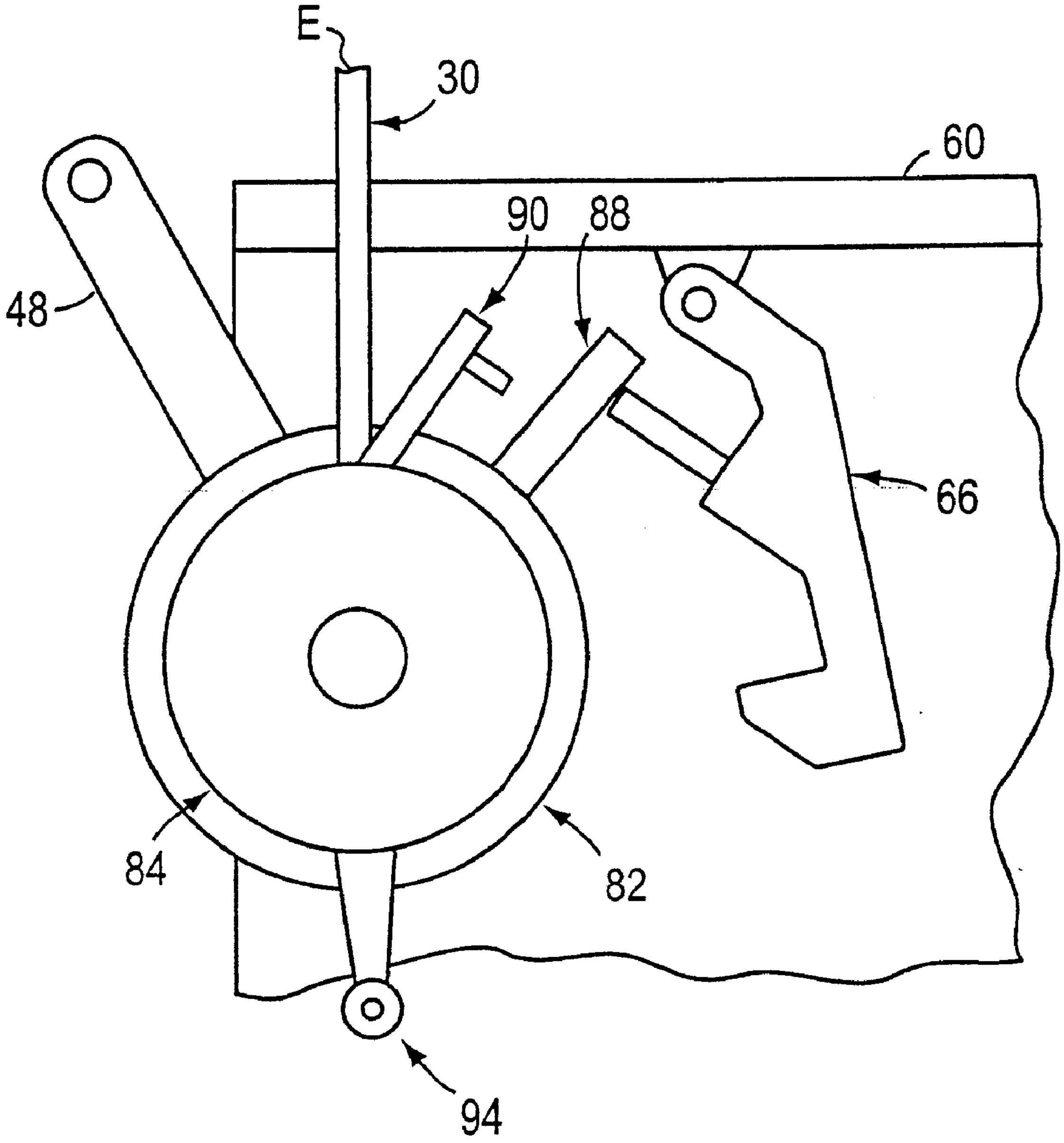
FIG. 8E is a side elevation view of the drive mechanism of FIG. 8A, showing the engagement arm in a closed position.

FIG. 8E shows the second hub 84 and engagement arm 30 in the closed position E (see also FIG. 1). As the engagement arm 30 approaches the closed position, or just after or simultaneously therewith, the rotating drive shaft 62 triggers the actuator 20 to close the switch mechanism 18. The actuator 20 is timed for this sequential operation by selecting the position of (or by adjusting) the latch release member 88 on the first hub 84, and by adjusting (or selecting the position of) the closing adjusting member 80. For example, the operation of the switch mechanism 18 can be timed for closing the switch mechanism contacts about 100–200 milliseconds after the engagement arm 30 reaches the second resistor contact position D (see FIG. 1), depending on the control operator selected. The first and second resistors 22 and 26 are thereby shorted out in a few cycles, so that substantially all of the current then flows through the switch mechanism 18.

Figure 9A:
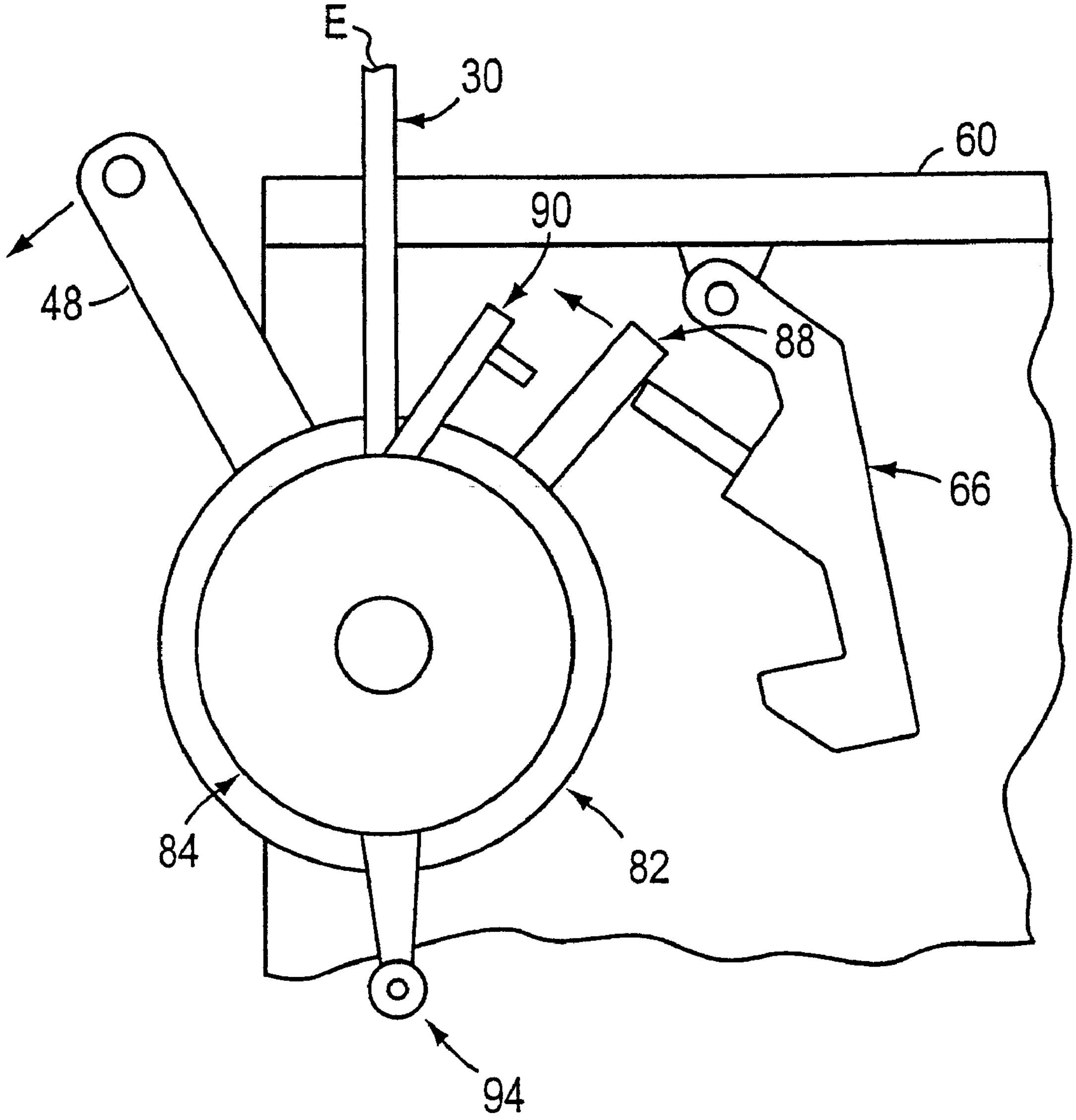
FIG. 9A is a side elevation view of the drive mechanism of FIGS. 6 and 7, showing the operation of the drive mechanism as the engagement arm begins to pivot through an opening stroke.
Figure 9B:
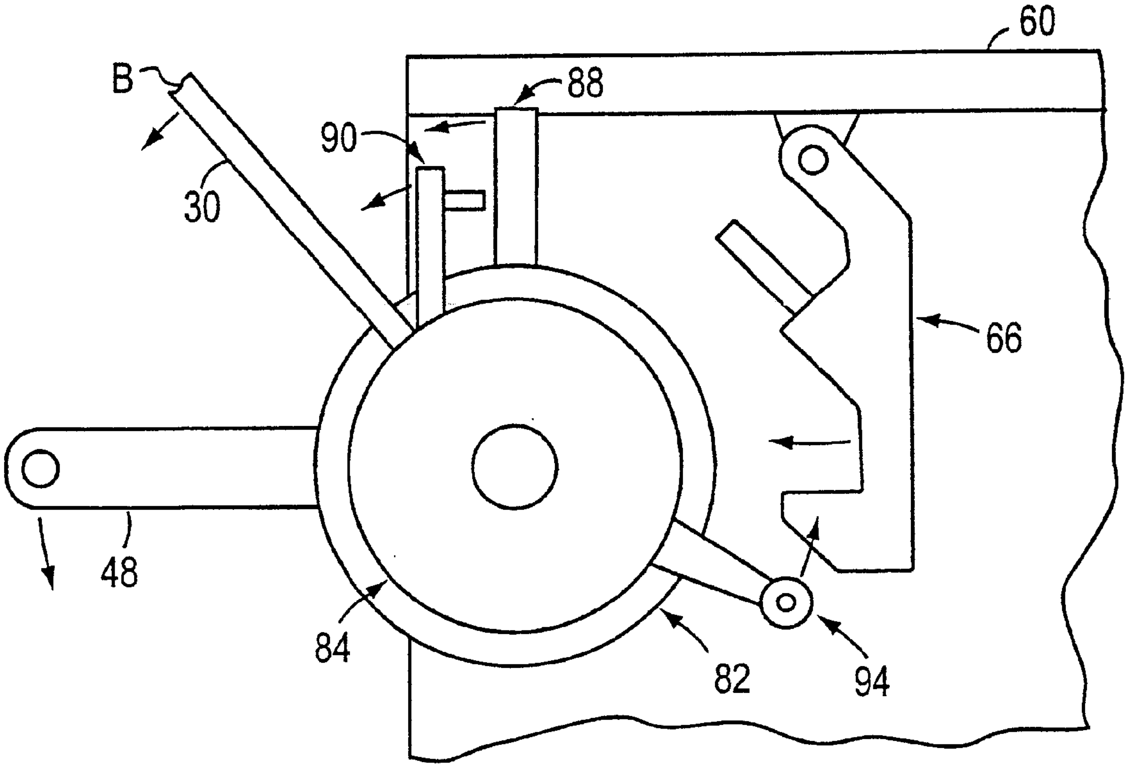
FIG. 9B is a side elevation view of the drive mechanism of FIG. 9A, showing the operation of the drive mechanism as the engagement arm pivots through the opening stroke.

Referring now to FIGS. 9A–9D, there is illustrated the operation of the drive mechanism 18 to pivot the engagement arm from the closed to the open position. FIG. 9A shows the engagement arm 30 in the closed position E (see also FIG. 1), while the switch mechanism 18 is also in the closed position. As shown in FIG. 9B, as the drive arm 48 and the first hub 82 rotate from the closed position toward the open position, the latch release member 88 contacts the stop member 90 and causes the second hub 84 to rotate from the second hub closed position to open position, thereby pivoting the engagement arm 30 toward the open position. As the engagement arm 30 begins to pivot open, or just thereafter, the rotating drive shaft 62 triggers the actuator 20 to open the switch mechanism 18. Similar to the closing operation, the actuator 20 is timed for this sequential operation by selecting the position of (or by adjusting) the latch release member 88 on the first hub 84, and by adjusting (or selecting the position of) the stop member 90.

Figure 9C:
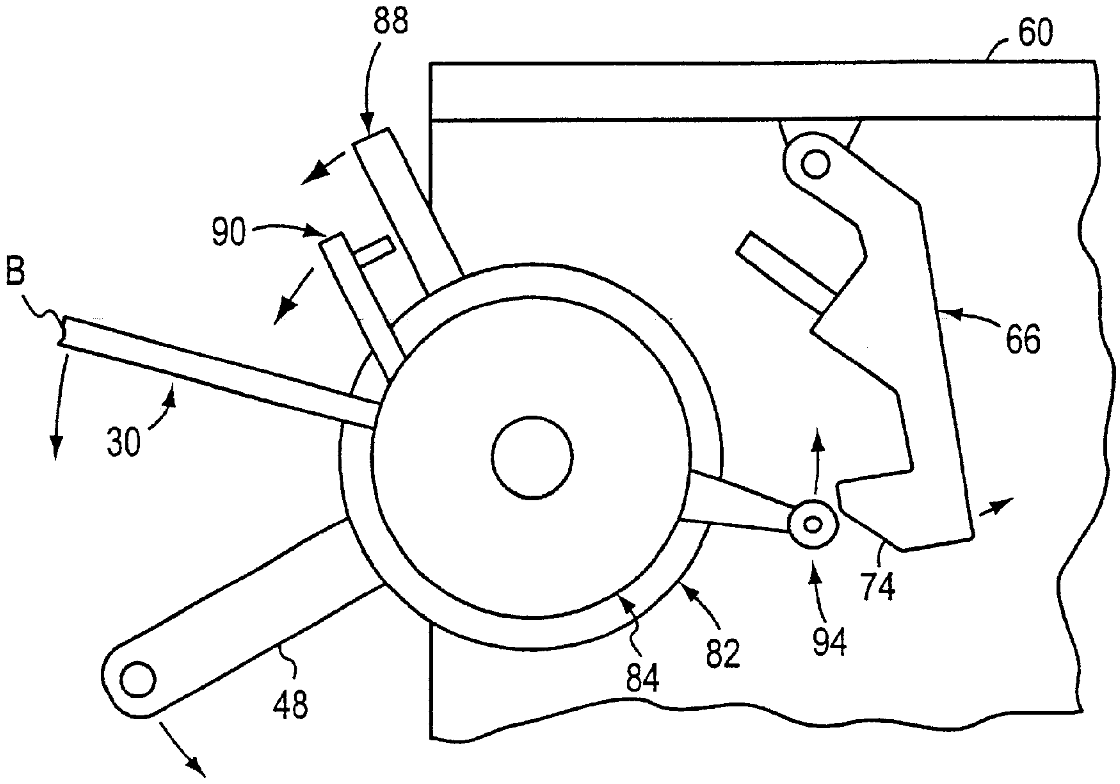
FIG. 9C is a side elevation view of the drive mechanism of FIG. 9A, showing the operation of the drive mechanism as the engagement arm begins to be locked into the open position.
Figure 9D:
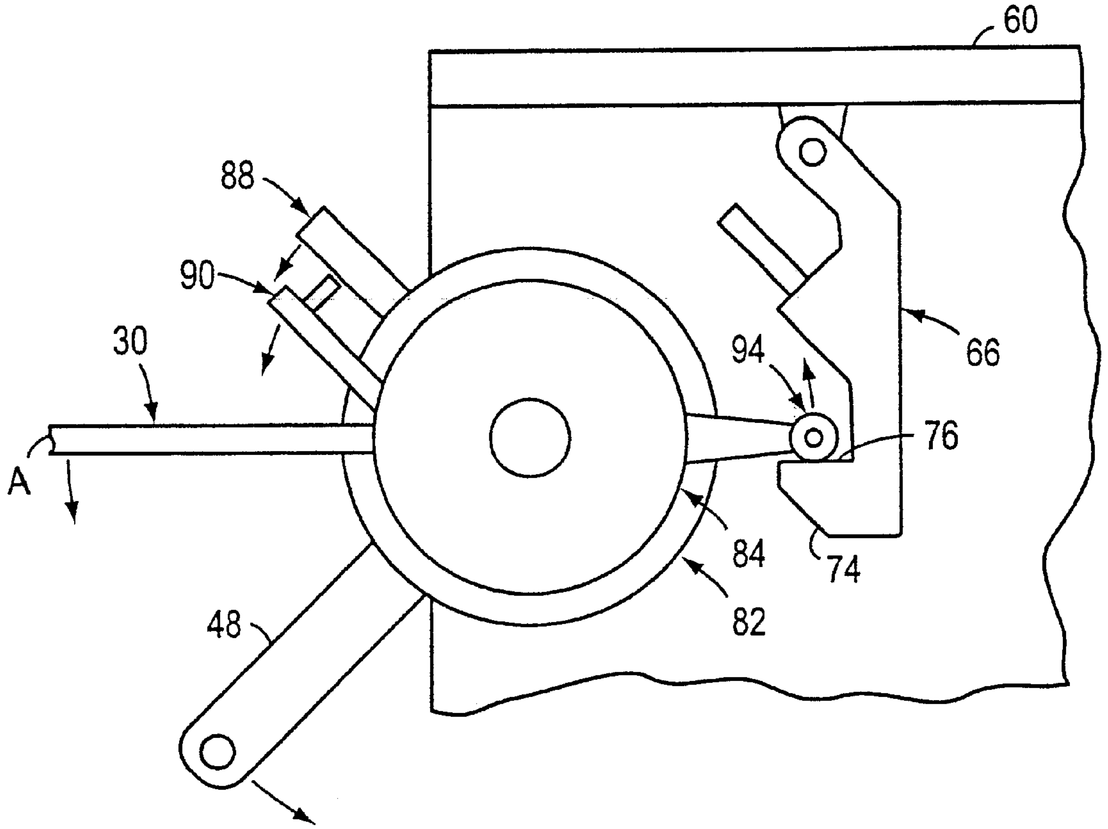
FIG. 9D is a side elevation view of the drive mechanism of FIG. 9A, showing the operation of the drive mechanism as the engagement arm pivots into the open position.

As shown in FIG. 9C, as the second hub 84 rotates further, the catch member 94 contacts the latch member opening surface 74 and pivots the latch member 66 from the latch engaged position to the disengaged position. As shown in FIG. 9D, as the second hub 84 rotates further and into the open position A, the catch member 94 moves past the latch member opening surface 94, permitting the latch member 66 to pivot back to the latch engaged position where the second hub 84 is prevented from rotating from the open to the closed position. The drive mechanism 64 is now set for the next closing operation.

Figure 10:
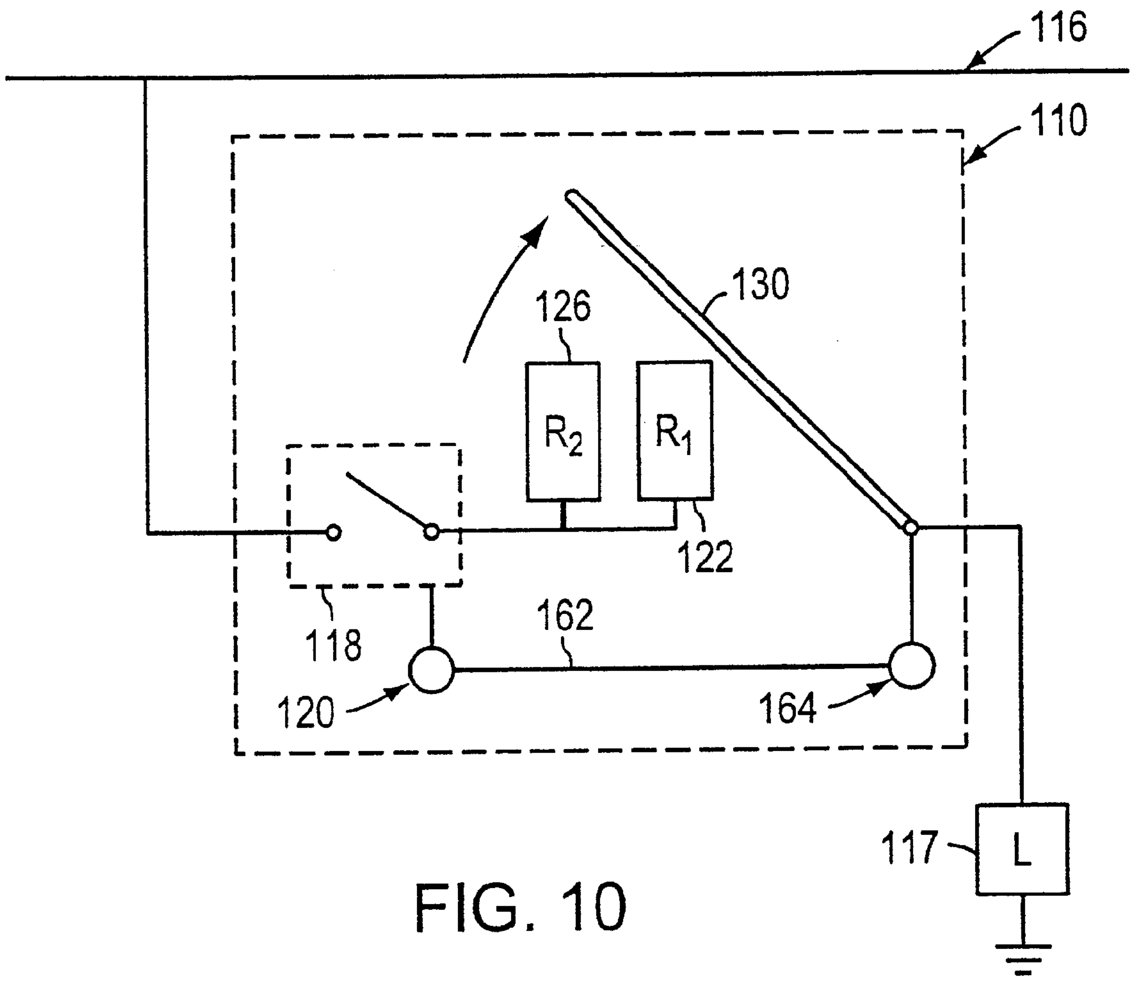
FIG. 10 is a schematic diagram of an alternative embodiment of the present invention, showing a staged introduction a first resistor, a second resistor, and an interrupter switch mechanism to disconnect a load from an electric power circuit.

Referring now to FIG. 10, there is shown an alternative switch 110 that is similar to the switch 10, and includes an interrupter switch mechanism 118, an actuator mechanism 120 for the interrupter switch, at least one current initiation device, for example, first and second resistors 122 and 126, an engagement arm 130, and a drive mechanism 164 for the engagement arm, with the drive mechanism and the actuator mechanism operatively coupled together by, for example, drive member 162. However, the switch 110 is used to connect a load 117 to a power line 116, and is adapted for introducing the resistors 122 and 126 into the circuit upon opening of the switch 110 to the split the voltage and thereby reduce electrical disturbances in the lines. These adaptations can include configuring the interrupter switch 118 in series with the resistors 122 and 126, and reversing the orientation of the drive mechanism 164 so that the whip action is produced during the opening stroke of the engagement arm 130. The resistors 122 and 126 can be configured in a staged arrangement so that the engagement arm 130 first contacts both and then only one of the resistors, so that it first contacts one then the other resistor, or in other configurations. Also, it will be understood that two (or another number) of drive mechanisms 164, engagement arms 130, resistor pairs 122 and 126, and interrupter switches 118 can be provided for generating the whip action on both the opening and closing stroke of the engagement arm, as may be desired.

Figure 12:
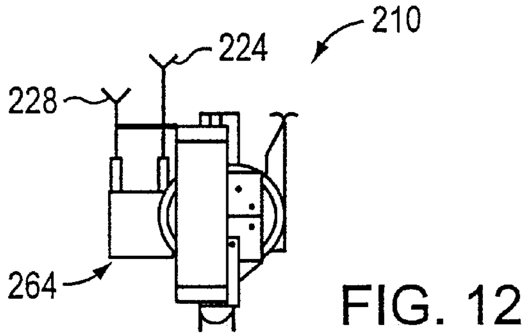
FIG. 12 is a plan view of the switch of FIG. 11.
Figure 11:
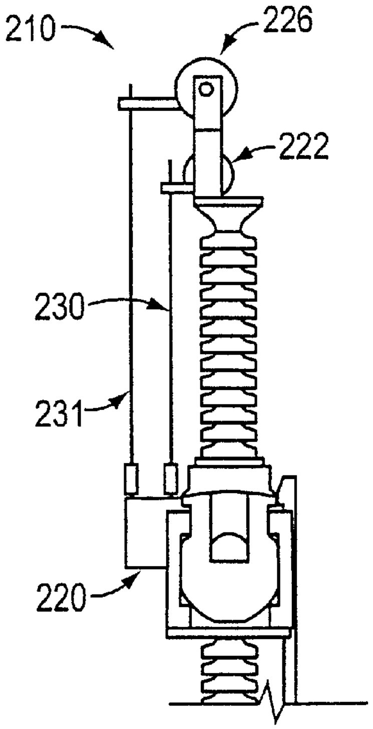
FIG. 11 is a front elevation view of a portion of an alternative switch of the present invention, showing a separate engagement arm for each resistor and contact.
Figure 13:
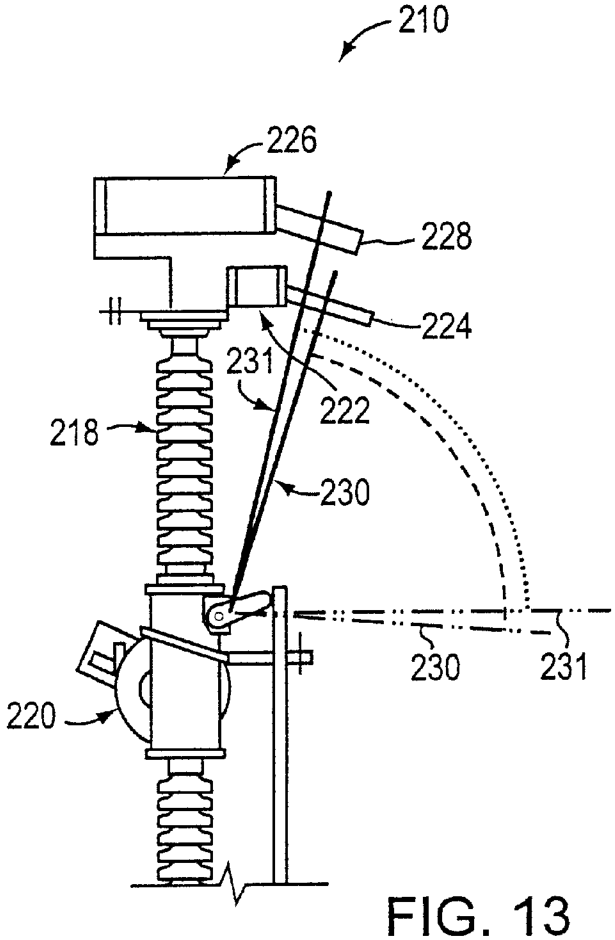
FIG. 13 is a side elevation view of the switch of FIG. 12.

Referring now to FIGS. 11–13, there is shown a portion of another alternative switch 210 that is similar to the switch 10. This embodiment includes an interrupter switch mechanism 218, an actuator mechanism 220 for the interrupter switch, at least one current initiation device, for example, first and second resistors 222 and 226, an engagement arm such as a whip for each current initiation device, for example, first and second engagement arms 230 and 231, and a drive mechanism 264 for the engagement arms, with the drive mechanism 264 and the actuator mechanism 220 operatively coupled together. The resistors have contacts for receiving the engagement arms, with a first contact 224 electrically connected to and extending from the first resistor 222 and a second contact 228 electrically connected to and extending from the second resistor 226, with the resistors and contacts configured in parallel with the interrupter switch.

In this embodiment, separate engagement arms are provided for each resistor contact, with the engagement arms positioned so that, when they pivot from the open to the closed position, the first contact 224 receives the first engagement arm 230 before the second contact 228 receives the second engagement arm 231. For example, the first engagement arm 230 can have a length that is less than a length of the second engagement arm 231, so the first engagement arm does not engage or interfere with the second contact, and the second engagement arm does not engage or interfere with the first contact. In this embodiment, there is provided additional flexibility in positioning the engagement arms and adjusting the timing of the introduction of the resistors into the switching circuit. Also, if one of the engagement arms mechanically fails, the other arm can still operate to provide some dampening of electrical disturbances upon closing of the switch 210, thereby providing greater reliability.

In addition to the above-described switches, there is provided a new method for switching an electrical device into an electric power circuit. The method can include providing a switch mechanism such as switch mechanism 18, a first resistor such as first resistor 22, and a second resistor such as second resistor 26. The first and second resistors can be disposed external of the switch mechanism 18. The method further includes initiating a current flow through the first resistor, initiating a current flow through the second resistor and limiting the current flow through the first resistor, and initiating a current flow through the switch mechanism and limiting the current flow through the first and second resistors. The method thereby provides for a smooth, staged introduction of a capacitor bank or another device into an electric circuit with reduced electrical disturbances.

In the present method, the step of initiating a current flow through the first resistor and the step of initiating a current flow through the second resistor can include providing the first and second resistors coupled to a first end of the switch mechanism, providing an engagement arm pivotally coupled to a second end of the switch mechanism, and pivoting the engagement arm from an open position separated from the first and second resistors to a closed position in contact with the first and second resistors so that the engagement arm contacts the first resistor before the engagement arm contacts the second resistor. Additionally, the step of pivoting the engagement arm from the open position to the closed position can include providing at least one drive mechanism coupled to the engagement arm, providing a rotary drive shaft operatively coupled to the drive mechanism, rotating the drive shaft, preventing pivoting of the engagement arm and generating a spring-loaded force urging the engagement arm to pivot from the open position to the closed position, releasing the engagement arm, and pivoting the engagement arm in response to the spring force.

Furthermore, the step of initiating a current flow through the switch mechanism can include providing an actuator mechanism operatively coupled to the switch mechanism and coupled to the rotary drive shaft, and actuating the actuator, in response to rotation of the drive shaft, to close at least two contacts of the switch mechanism to initiate current flow through the switch mechanism and limit the current flow through the first and second resistors.

Thus, it will be appreciated that the switching apparatus and/or method provide for a staged introduction of the capacitor bank into the electric power circuit with significantly reduced electrical disturbances. Furthermore, the switch is easy to adjust for properly timing the staged switching operation, is durable and reliable over thousands of operations, and can be made and used at an affordable cost.

In the embodiments described above and in the following claims, the words "a," "an," and "one" are not intended to mean only "one" but can also mean any number greater than one, unless specified otherwise herein. While certain embodiments are described above with particularity, these should not be construed as limitations on the scope of the invention. It should be understood, therefore, that the foregoing relates only to the exemplary embodiments of the present invention, and that numerous changes may be made therein without departing from the spirit and scope of the invention as defined by the following claims.

The invention claimed is:

1. A switch for an electric power circuit, comprising:

a) a switch mechanism having a first contact and a second contact disposed within a housing and movable between an open position with the contacts separated and a closed position with the contacts in contact, and having a first end coupled to the first contact and a second end coupled to the second contact;

b) a first resistor coupled to the first end of the switch mechanism;

c) a second resistor coupled to the first end of the switch mechanism; and d) at least one engagement arm external to the housing, coupled to the second end of the switch mechanism and movable between an open position separated from the resistors and a closed position in contact with the resistors, wherein during a closing stroke of the switch mechanism the first resistor and the second resistor are positioned so that when the engagement arm moves from the open position to the closed position, the engagement arm contacts the first resistor before the second resistor and the engagement arm contacts the second resistor before the switch contacts close.

2. The switch of claim 1, wherein the first resistor has an electrical resistance that is different from an electrical resistance of the second resistor.

3. The switch of claim 2, wherein the electrical resistance of the first resistor is substantially greater than the electrical resistance of the second resistor.

4. The switch of claim 1, wherein the first and second resistors each have a contact adapted to receive the engagement arm and disposed external to the housing.

5. The switch of claim 4, wherein the first and second resistors are disposed external to the housing.

6. The switch of claim 4, wherein the first resistor contact has a length that is greater than a length of the second resistor contact.

7. The switch of claim 1, wherein a first current path is formed by the engagement arm and the first resistor when the engagement arm contacts the first resistor, a second current path is formed by the engagement arm and the second resistor when the engagement arm contacts the second resistor, and a third current path is formed by the contacts of the switch mechanism when the contacts are closed, wherein the first, second, and third current paths are arranged in an electrically parallel configuration.

8. The switch of claim 7 wherein the first current path has an electrical resistance that is greater than an electrical resistance of the second current path, and the electrical resistance of the second current path is greater than an electrical resistance of the third current path.

9. The switch of claim 1, further comprising an actuator mechanism coupled to the switch mechanism and operable to move the switch contacts between the open position and the closed position.

10. The switch of claim 9, further comprising at least one drive mechanism coupled to the engagement arm and the actuator mechanism, wherein the drive mechanism is operable to move the engagement arm between the open position and the closed position so that the engagement arm contacts the first and second resistors before the actuator closes the contacts.

11. The switch of claim 1, wherein the at least one engagement arm comprises a first engagement arm and a second engagement arm, wherein the first and second resistors and the first and second engagement arms are positioned so that, when the engagement arms move from the open position to the closed position, the first engagement arm contacts the first resistor before the second engagement arm contacts the second resistor and the second engagement arm contacts the second resistor before the switch contacts close.

12. The switch of claim 11, wherein the first engagement arm has a length that is less than a length of the second engagement arm.

13. A switch for an electric power circuit, comprising:

a) a switch mechanism having a first contact and a second contact disposed within a housing and movable between an open position with the contacts separated and a closed position with the contacts in contact, and having a first end coupled to the first contact and a second end coupled to the second contact;

b) at least one actuator mechanism coupled to the switch mechanism and operable to move the switch contacts between the open position and the closed position;

c) at least one current initiation device coupled to the first end of the switch mechanism;

d) at least one engagement arm external to the housing, coupled to the second end of the switch mechanism and movable between an open position separated from the current initiation device and a closed position in contact with the current initiation device; and e) at least one drive mechanism coupled to the engagement arm and to the actuator mechanism, wherein the drive mechanism is operable to move the engagement arm between the open position and the closed position in a closing stroke of the switch mechanism so that the engagement arm contacts the current initiation device before the actuator mechanism moves the contacts into the closed position.

14. The switch of claim 13, wherein the current initiation device comprises at least one resistor.

15. The switch of claim 13, further comprising a drive member, wherein the actuator mechanism and the drive mechanism are coupled to the drive member and operate in response to movement of the drive member.

16. The switch of claim 15, wherein the drive member comprises a rotary drive shaft with a drive arm coupled thereto.

17. The switch of claim 15, wherein the drive mechanism comprises:

a) a first hub that is coupled to the drive member and that moves between a first hub open position and a first hub closed position in response to movement of the drive member, the first hub having a latch release member;

b) a second hub that is biased to move between a second hub open position and a second hub closed position in response to movement of the first hub, the second hub having a catch member; wherein the engagement arm is coupled to the second hub; and c) a movable latch member that is biased towards an engaged position wherein the latch member contacts the catch member and prevents movement of the second hub from the second hub open position to the closed position, and wherein the latch release member is positioned so that, when the first hub is moved from the first hub open position toward the closed position, the latch release member contacts and moves the latch member away from the second hub into a disengaged position permitting the second hub to move from the second hub open position to the closed position.

18. The switch of claim 17, wherein the latch member has an adjustable closing latch member that is positioned so that, when the first hub is moved from the first hub open position toward the closed position, the latch release member contacts the adjustable closing latch member.

19. The switch of claim 17, wherein the second hub has an adjustable stop member positioned thereon so that, when the first hub moves from the first hub closed position toward the open position, the latch release member contacts the stop member and causes the second hub to move from the second hub closed position to open position.

20. The switch of claim 19, wherein the latch member has an opening latch surface defined thereon so that, when the second hub moves from the second hub closed position to the open position in response to movement of the first hub from the first hub closed position to the open position, the catch member contacts the opening latch surface and moves the latch member from the latch engaged position to the disengaged position.

21. A switch for an electric power circuit, comprising:

a) a switch mechanism having a first contact and a second contact movable between an open position with the contacts separated and a closed position with the contacts in contact, and having a first end coupled to the first contact and a second end coupled to the second contact;

b) at least one actuator mechanism coupled to the second end of the switch mechanism and operable to move the switch contacts between the open position and the closed position;

c) a first resistor coupled to the first end of the switch mechanism and having a contact with an engagement end, wherein the first resistor has an electrical resistance;

d) a second resistor coupled to the first end of the switch mechanism and having a contact with an engagement end, wherein the second resistor has an electrical resistance that is less than the electrical resistance of the first resistor;

e) at least one whip pivotally coupled to the second end of the switch mechanism and pivotal between an open position separated from the resistor contacts and a closed position in contact with the resistor contacts;

f) at least one drive mechanism coupled to the whip and operable to pivot the whip between the open position and the closed position, wherein the drive mechanism is operable to pivot the whip between the open position and the closed position so that the whip contacts the contact end of the first resistor before the whip contacts the contact end of the second resistor; and g) a rotary drive shaft coupled to the actuator mechanism and the drive mechanism, wherein the actuator mechanism and the drive mechanism operate in response to rotation of the drive shaft.

22. The switch of claim 21, wherein the drive mechanism comprises:

a) a first hub that is coupled to the rotary drive shaft and that rotates between a first hub open position and a first hub closed position in response to rotation of the drive shaft, the first hub having a latch release member;

b) a second hub that is biased to rotate between a second hub open position and a second hub closed position in response to rotation of the first hub, the second hub having a catch member; wherein the whip is coupled to the second hub; and c) a pivotal latch member that is biased towards an engaged position wherein the latch member contacts the catch member and prevents rotation of the second hub from the second hub open position to the closed position, and wherein the latch release member is positioned so that, when the first hub is rotated from the first hub open position toward the closed position, the latch release member contacts and pivots the latch member away from the second hub into a disengaged position permitting the second hub to rotate from the second hub open position to the closed position.

23. The switch of claim 22, wherein the latch member has an adjustable closing latch member that is positioned so that, when the first hub is rotated from the first hub open position toward the closed position, the latch release member contacts the adjustable closing latch member.

24. The switch of claim 22, wherein the second hub has an adjustable stop member positioned thereon so that, when the first hub rotates from the first hub closed position toward the open position, the latch release member contacts the stop member and causes the second hub to rotate from the second hub closed position to open position.

25. The switch of claim 22, wherein the latch member has an opening latch surface defined thereon so that, when the second hub rotates from the second hub closed position to the open position in response to rotation of the first hub from the first hub closed position to the open position, the catch member contacts the opening latch surface and urges the latch member to pivot from the latch engaged position to the disengaged position.

26. The switch of claim 21, wherein the switch mechanism includes a sealed housing and a dielectric gas contained within the housing, wherein at least a portion of the contacts are disposed within the housing and the resistors are disposed external of the housing.

27. The switch of claim 21, further comprising at least one additional resistor coupled to the first end of the switch mechanism.

28. A three-pole switch for an electric power circuit, comprising three of the switches of claim 21.

29. The three-pole switch of claim 28, further comprising at least one three-pole operator mechanism operatively connected to the three-pole switch.

30. A method for switching an electrical device into an electric power circuit, comprising:

a) providing a switch mechanism having contacts in a housing, a first resistor, and a second resistor, wherein the first and second resistors are disposed external of the switch mechanism housing;

b) initiating a current flow through the first resistor;

c) initiating a current flow through the second resistor and limiting the current flow through the first resistor; and d) initiating a current flow through the switch mechanism and limiting the current flow through the first and second resistors.

31. The method of claim 30, wherein the step of initiating a current flow through the first resistor and the step of initiating a current flow through the second resistor comprise:

a) providing the first and second resistors coupled to a first end of the switch mechanism;

b) providing an engagement arm pivotally coupled to a second end of the switch mechanism and external to the switch mechanism housing; and c) pivoting the engagement arm from an open position separated from the first and second resistors to a closed position in contact with the first and second resistors so that the engagement arm contacts the first resistor before the engagement arm contacts the second resistor.

32. The method of claim 31, wherein the step of pivoting the engagement arm from the open position to the closed position comprises:

a) providing at least one drive mechanism coupled to the engagement arm;

b) providing a rotary drive shaft operatively coupled to the drive mechanism;

a) rotating the drive shaft;

b) preventing pivoting of the engagement arm and generating a spring-loaded force urging the engagement arm to pivot from the open position to the closed position;

c) releasing the engagement arm; and d) pivoting the engagement arm in response to the spring force.

33. The method of claim 32, wherein the step of initiating a current flow through the switch mechanism comprises:

a) providing an actuator mechanism operatively coupled to the switch mechanism and coupled to the rotary drive shaft; and b) actuating the actuator, in response to rotation of the drive shaft, to close at least two contacts of the switch mechanism to initiate current flow through the switch mechanism and limit the current flow through the first and second resistors.

34. A switch for an electric power circuit, comprising:

a) a switch mechanism having a first contact and a second contact disposed within a housing and movable between an open position with the contacts separated and a closed position with the contacts in contact;

b) at least one actuator mechanism coupled to the switch mechanism and operable to move the switch contacts between the open position and the closed position;

c) at least one current initiation device configured in series with the switch mechanism;

d) at least one engagement arm external to the housing, configured in series with the switch mechanism and movable between an open position separated from the current initiation device and a closed position in contact with the current initiation device; and e) at least one drive mechanism coupled to the engagement arm and to the actuator mechanism, wherein the drive mechanism is operable to move the engagement arm between the closed position and the open position so that the engagement arm contacts the current initiation device before the actuator mechanism moves the contacts into the open position.

35. The switch of claim 34, wherein the current initiation device comprises a first resistor and a second resistor configured in a staged arrangement.

36. The switch of claim 34, further comprising a drive member, wherein the actuator mechanism and the drive mechanism are coupled to the drive member and operate in response to movement of the drive member.

* * * * *